(12) United States Patent
Adams et al.

(10) Patent No.: US 6,330,147 B1
(45) Date of Patent: Dec. 11, 2001

(54) METHOD AND APPARATUS FOR MOUNTING COMPONENTS USING A Z-SPRING

(75) Inventors: Jacklin Ann Adams, Cary; Dean Frederick Herring, Youngsville; John Robert Kirksey, Cary; William Fred Otto, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/444,049

(22) Filed: Nov. 19, 1999

(51) Int. Cl.[7] ............................. G06F 1/16; H05K 5/02
(52) U.S. Cl. .................. 361/679; 361/685; 361/809; 361/704; 361/727
(58) Field of Search ............................ 361/724–727, 361/684, 685, 686, 704, 707, 710, 809, 683; 257/718, 719, 726, 727; 312/333, 332.11

(56) References Cited

U.S. PATENT DOCUMENTS

| | | | |
|---|---|---|---|
| 1,748,482 | * | 2/1930 | Horton ................................. 361/809 |
| 3,902,681 | | 9/1975 | Boehme . |
| 5,563,450 | | 10/1996 | Bader . |
| 5,587,889 | | 12/1996 | Sacherman . |
| 5,615,735 | * | 4/1997 | Yoshida et al. ...................... 361/709 |
| 5,721,673 | * | 2/1998 | Klein .................................... 361/809 |
| 5,734,557 | * | 3/1998 | McAnally et al. ................... 361/727 |
| 5,805,429 | | 9/1998 | Anderson . |
| 5,806,949 | * | 9/1998 | Johnson ............................... 361/685 |
| 6,008,984 | * | 12/1999 | Cunningham et al. .............. 361/683 |
| 6,069,789 | * | 5/2000 | Jung .................................... 361/724 |
| 6,134,376 | * | 10/2000 | Lee et al. ............................. 361/727 |
| 6,256,204 | * | 7/2001 | Wormsbecher et al. ............ 361/727 |

* cited by examiner

*Primary Examiner*—Leo P. Picard
*Assistant Examiner*—Lea Edmonds
(74) *Attorney, Agent, or Firm*—George E. Grosser; Andrew Dillon

(57) ABSTRACT

A system and method of mounting components to a frame, such as a disk drive in the mounting frame of a personal computer shaped to receive the disk drive in a releasable fashion within the frame. A tubular spring member with a z-shaped base and outwardly-extending legs is made of a spring steel and formed with flattened leg ends fits within holes in the component to secure the component to a guide member, with the guide member mounted within the mounting frame. The disk drive component with the guide member secured by the Z-spring slides into a slot on the frame of the personal computer and is secured in place to provide a releasable assembly for replacement of the disk drive as desired.

9 Claims, 3 Drawing Sheets

METHOD AND APPARATUS FOR MOUNTING COMPONENTS USING A Z-SPRING

BACKGROUND OF THE INVENTION

1. Field of the Invention

The present invention is an improved apparatus and method for mounting components within a housing or rack. More particularly, the present invention relates to a system and apparatus for mounting computer components such as a removable data access storage device (sometimes referred to in the industry as "DASD") within a housing, for example, in a personal computer or similar system.

2. Background Art

A data processing system such as a personal computer is frequently an assemblage of several components which are assembled into a system through the use of a frame or rack. It is desirable that the components be securely positioned within the frame, yet easily removable for replacement, for example, in the case of failure or upgrade. This is especially true for DASD components such as floppy disk drives in a personal computer, where DASD devices are each slid into a rack into the proper position, then secured in place.

One technique which has been proposed is to use screws to secure components like DASD in place. However, such an assembly method would require that a plurality of threaded screw holes be provided in proper position and that multiple screws be threaded into the screw holes, a process which requires added expense and is time consuming for manufacture as well as any disassembly which might be required for service or upgrading of the component.

Another approach is to snap a bracket into holes to retain the component within a rail which is then slid into a slot in the rack. While this approach has some advantages over a system using screws in threaded holes, the bracket which snaps in also has a tendency to snap out rather easily. It also tends to relax over time, reducing the retaining force provided by the bracket. This is believed to occur because forces on the legs of the bracket tend to uncouple the bracket and the component from its coupling to its rail. The rail and the component cannot be secured within the frame when they are uncoupled. Further, if force on the legs of the bracket deflect the bracket into a concave shape looking from the direction of the component, then the forces on the bracket tend to decouple the bracket from the rail and component, which is undesirable.

Accordingly, the prior art systems and methods for mounting components within a housing have undesirable disadvantages and limitations.

SUMMARY OF THE INVENTION

The present invention overcomes the limitations and disadvantages of the prior art systems by providing a system for securing a component in a removable fashion within a frame. It has the advantage that it is simple and inexpensive, with a reduce number and cost of parts and low labor cost for assembly.

It has the further advantage that it allows components to be easily and quickly removed for servicing and for upgrading. It avoids the need for screws and a screwdriver for assembly and disassembly and avoids the need for threaded holes to be provided during the manufacturing process.

The present invention allows the assembly and disassembly without the need for multiple small parts (such as screws or brads) which can become misplaced and lost during disassembly of the system.

It has the further advantage that the securing member provides a retaining force which resists relaxation or degradation over time. Forces on the legs of the a z-spring tend to be absorbed by the spring rather than providing forces which would tend to remove the spring member from its seat securing the component to the rail. Looking from the direction of the secured component, forces on the legs of the spring urge the spring into a compressed shape which has the tendency to better secure the rail to component rather than tending to decouple them.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Some of the objects and advantages of the present invention having been described above, other features of the present invention will be apparent to those skilled in the art in view of the drawings illustrating the present invention in which.

DETAILED DESCRIPTION OF THE PREFERRED EMBODIMENT

In the following description of the preferred embodiment, the best implementation of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
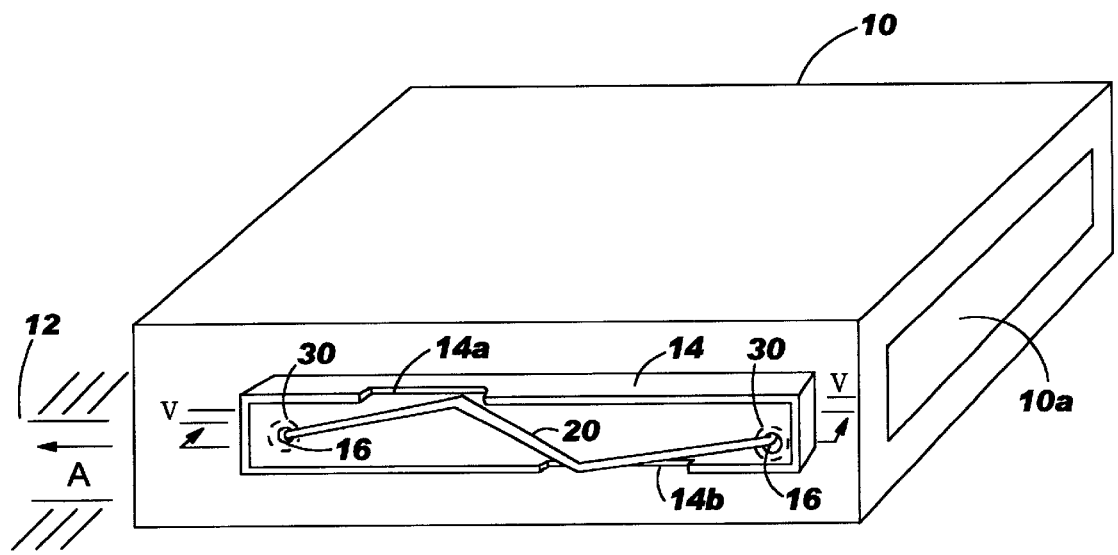
FIG. 1 is a perspective view of a component and rail assembly useful in understanding the present invention.

FIG. 1 shows a component 10 suitable for releasable mounting within a personal computer (not shown). The front face of the component shows an aperture 10a through which diskettes might be inserted into a DASD device for reading and writing so-called floppy disks, although the present invention is equally relevant to mounting other components (such as CD-ROM drives, hardfiles, power supplies and modems within a frame, and even to other devices such as stereo components within a stereo or a radio within a car dashboard). The component is slid in the direction of the arrow A into a receiving aperture 12 defined by a frame of the personal computer. A rail 14 is mounted to the component 10 by a z-shaped spring 20 through apertures 16 in the rail 14. Although not shown in this view, the apertures 16 in the rail 14 are aligned with apertures in the component so that the z-shaped spring 20 secures the component 10 to the rail 14 for assembly into the personal computer. The z-spring 20 can be removed easily from the component 10 and rail 14 for disassembly as desired, simply by applying a force on the spring 20 directed away from the component 10, locating the force near the middle portion of the spring 20. The spring can also be installed into the aligned apertures in the rail and the component 10 by simply pressing it into place.

An optional grommet (or other electrically-insulating material) 30 is shown on the spring member 20, adjacent the aperture 16 of the rail 14. The spring member 20 is preferably made from a spring steel, and the grommet 30 has the advantage that it will insulate the spring member 20 from the rail 14, if necessary.

The rail 14 is shown with side walls having cutout portions 14a, 14b shown to accommodate the outward extensions of the spring 20. Such cut out portions 14a, 14b allow for a narrower rail 14 than if the rail had to be wide enough to allow the spring 20 to fit completely within the walls.

Figure 2:
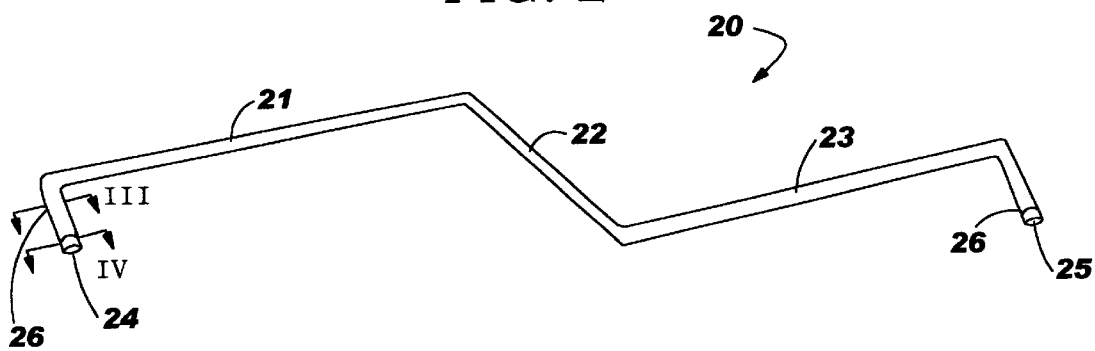
FIG. 2 is an enlarged, perspective view of a z-shaped spring member of the type illustrated in FIG. 1.

FIG. 2 illustrated an enlarged perspective view of the z-shaped spring 20 as shown in FIG. 1. The spring 20 includes a base portion which is generally coplanar and includes a first base portion 21, a second base portion 22 and a third base portion 23. The spring also includes end portions 24, 25 which extend outwardly from the plane of the base portions. Since the first base portion 21 and the third base portion are generally parallel and meet the center portion 22 at an obtuse angle, the base portion tends to look something like the letter "Z" and hence the reference to this member 20 as a z-spring. A force on the end portion 24 tends to be transmitted along the axis of the first portion 21, causing a compression force on the spring 20, rather than making the entire spring member bow, which might have the effect of making the spring dislodge from its seat in the apertures of the component 10.

Figure 3:
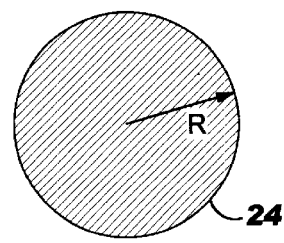
FIG. 3 is a cross sectional view of a part of the spring member of FIG. 2, taken along the line III—III looking in the direction of the arrows.
Figure 4:
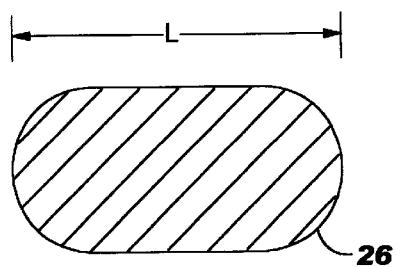
FIG. 4 is a cross sectional view of the spring member of FIG. 2 from the line IV—IV, looking in the direction of the arrows.

FIGS. 3–4 are cross sectional views of portions of the spring member 20, taken along the lines 111—111 and IV—IV, respectively to illustrate that the end portions 24, 25 have been flattened to provide increased retention within the apertures of the component 10. This flattening may be accomplished in any conventional method, but swaging or cold forming of this enlargement is believed desirable. The end portion 24 is basically a circle having a radius R, indicating the cylindrical cross section of the spring member 20 through much of its length, formed through bending a length of spring steel into the desired z-shape described above. In the region of enlarged ends 26, the end portions are formed into more elliptical portions having a length L which is greater than the radius R and a height H which is less than the radius R. The length L is chosen to be slightly smaller than the diameter of the receiving aperture in the component to provide improved retention of the spring 20 within the aperture.

Figure 5:
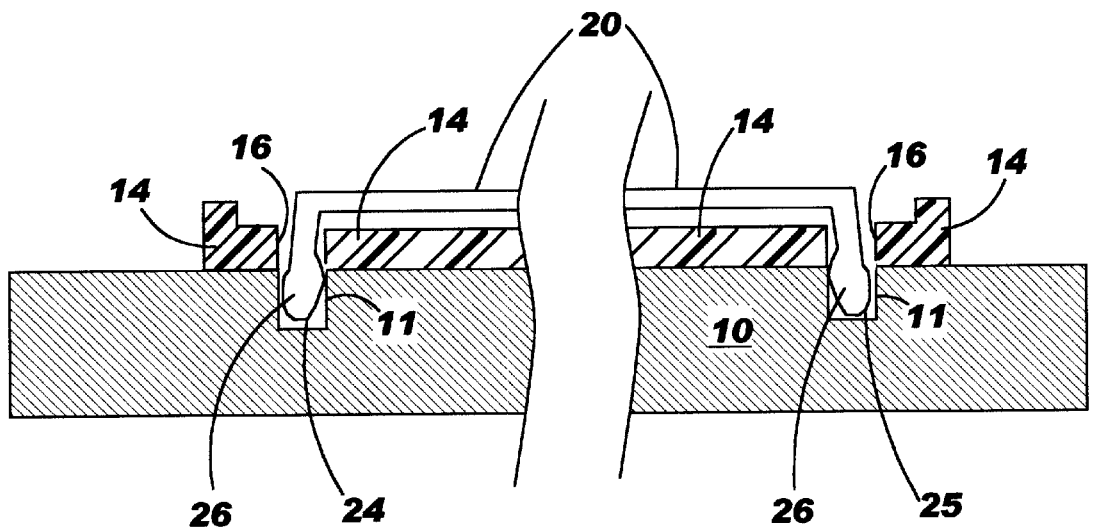
FIG. 5 is a cutaway, cross-sectional view of the component and rail assembly of FIG. 1, looking from the line V—V in the direction of the arrows.

As shown in FIG. 5, the ends of the spring 20 fit through apertures 16 in the rail 14 and into apertures 11 in the component 10. The elliptical portions 26 fit into the apertures 11 and provide greater retention force than if the ends had not been flattened. An outward force F1 on the end portions 26 causes the spring 20 to deform in a convex sense with respect to the component 10, causing an increased retention force between the spring 20 and the component 10.

Of course, many modifications of the present invention will be apparent to those skilled in the relevant art in view of the foregoing description of the preferred embodiment, taken together with the accompanying drawings. For example, the bracket could be formed from a member which has a different cross section (perhaps oval, square or rectangular) from that which is disclosed. Additionally, the spring member could be formed from a different material, if desired, and the shape of the rail with side portions removed could be avoided, if necessary. Thus, many changes to the preferred embodiment could be made without departing from the spirit of the present invention. Also, some of the features of the present invention could be used to advantage without the corresponding use of other features. As an example, the flattened end portions are optional and present to enhance the retaining properties of the present invention. The grommet or electrical insulation between the spring and the rail are also described as optional. Accordingly, the foregoing description of the preferred embodiment should be considered as merely illustrative of the principles of the present invention and not in limitation thereof.

Having thus described the invention, what is claimed is:

1. A system for securing a component removably within a frame having a receiving aperture, the system comprising:

the component including spaced apertures on at least one side;

an elongated member shaped to fit within the receiving aperture of the frame is assembled over the component and including apertures complementary with the spaced apertures in the component; and a spring member coupling the elongated member to the component, said spring member including a base portion and a pair of outwardly projecting ends extending from the base portion, with the base portion being formed in the shape of the letter z, whereby the spring member is removable to release the component from the elongated member and the z-shaped base portion absorbs forces which may occur on the projecting ends.

2. A system for including the elements of claim 1 wherein the spring member is made of a spring steel.

3. A system of the type described in claim 1 wherein the end portions of the spring member are flattened.

4. A system of the type described in claim 3 wherein the width of the flattened ends are slightly less than the diameter of the apertures to provide increased retention.

5. A system of the type described in claim 1 wherein a grommet is disposed between the spring member and the elongated member to provide electrical isolation between the spring member and the elongated member and component.

6. A method of mounting a component to a frame with an elongated slot, the steps of the method comprising:

providing the component with spaced apertures;

providing an elongated member shaped to fit within the slot defined by the frame;

mounting the elongated member to the component by a spring having a z-shaped base portion and outwardly extending ends, with the outwardly extending ends fitting through the elongated member and into the apertures in the component.

7. A method including the steps of claim 6 and further including the step of providing the outwardly extending ends of the spring with flattened end portions.

8. A method including the steps of claim 6 wherein the step of mounting the elongated member with a spring includes providing a spring made from spring steel and formed with flattened end portions.

9. A method of assembling components including the steps of claim 6 and further including the step of mounting an electrical insulator between the spring and the elongated member to electrically isolated the spring ember from the elongated member.

* * * * *